Aug. 23, 1966       T. ROWLANDS       3,267,821
MANUFACTURE OF MOUTHPIECE FOR CIGARETTES
Filed Sept. 23, 1963       4 Sheets-Sheet 3
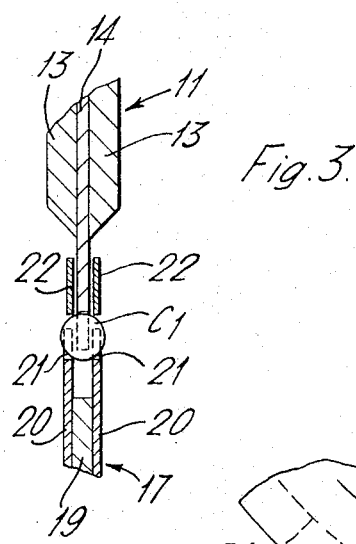
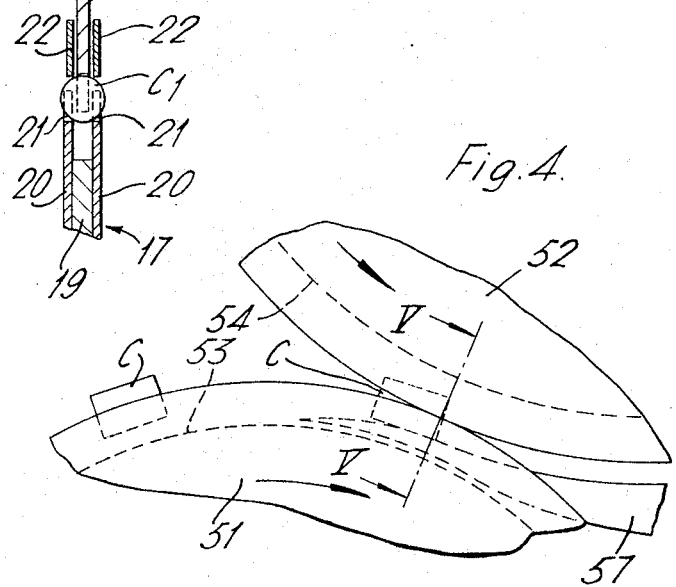
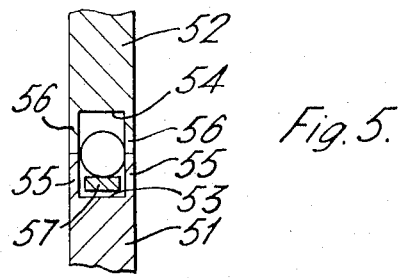

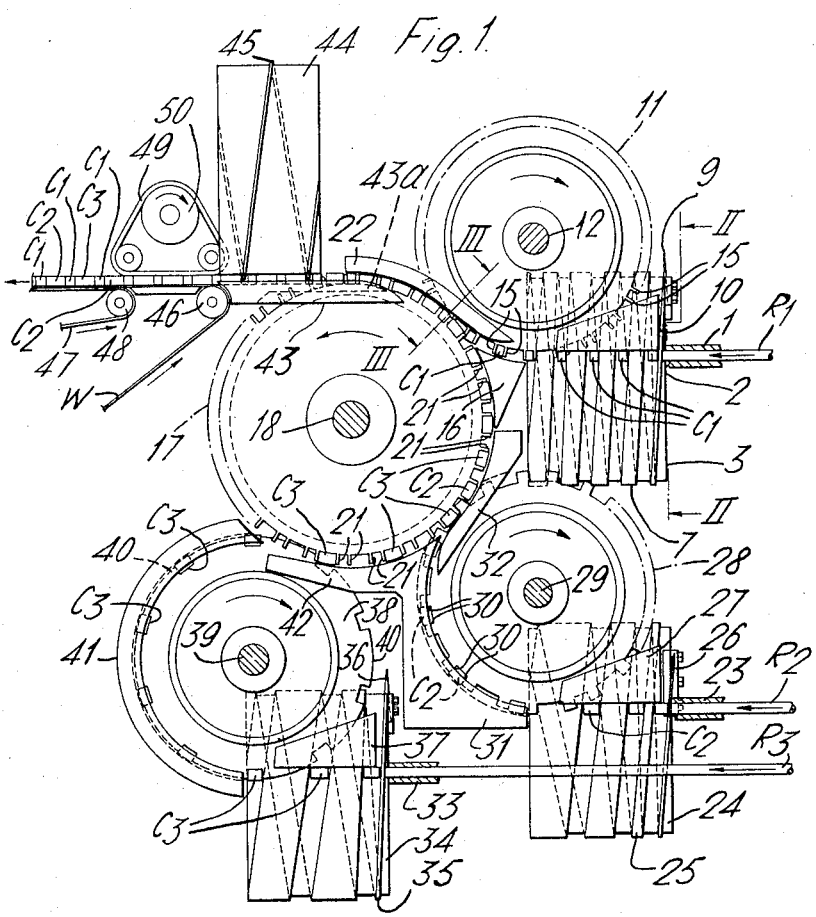

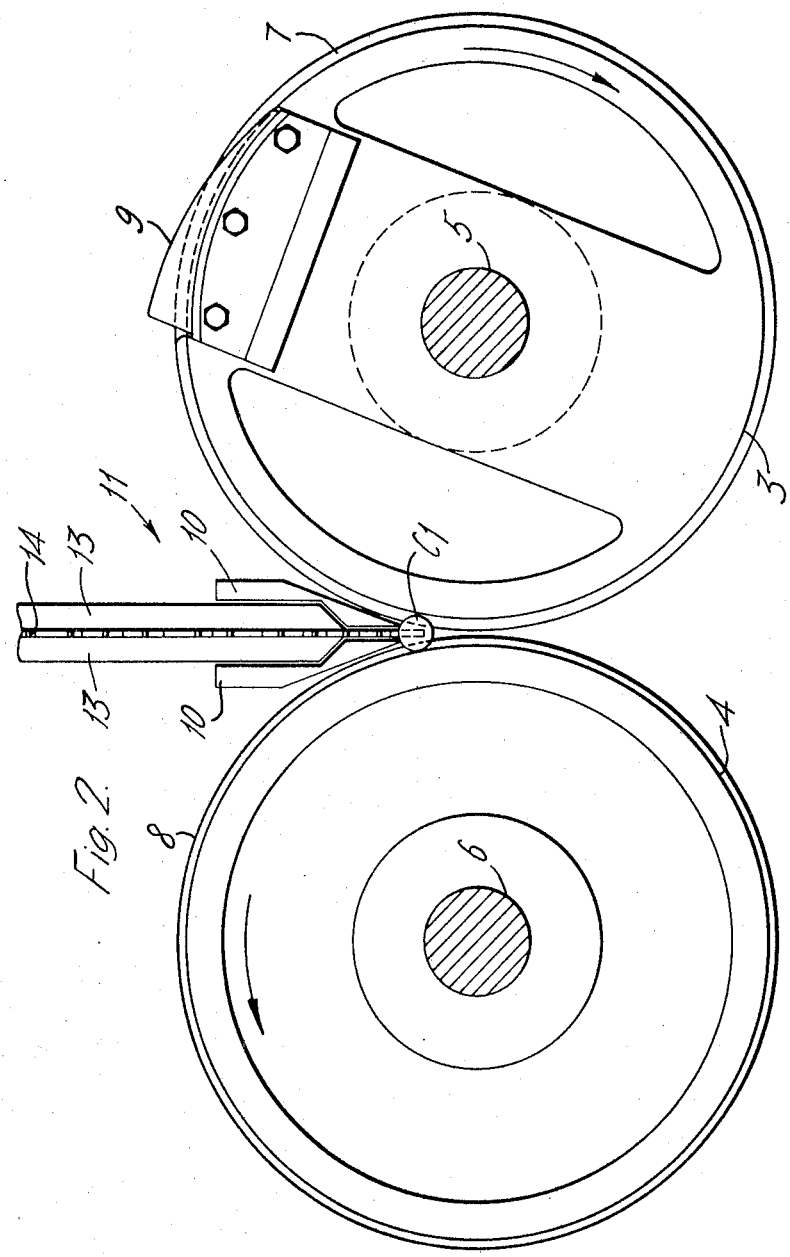

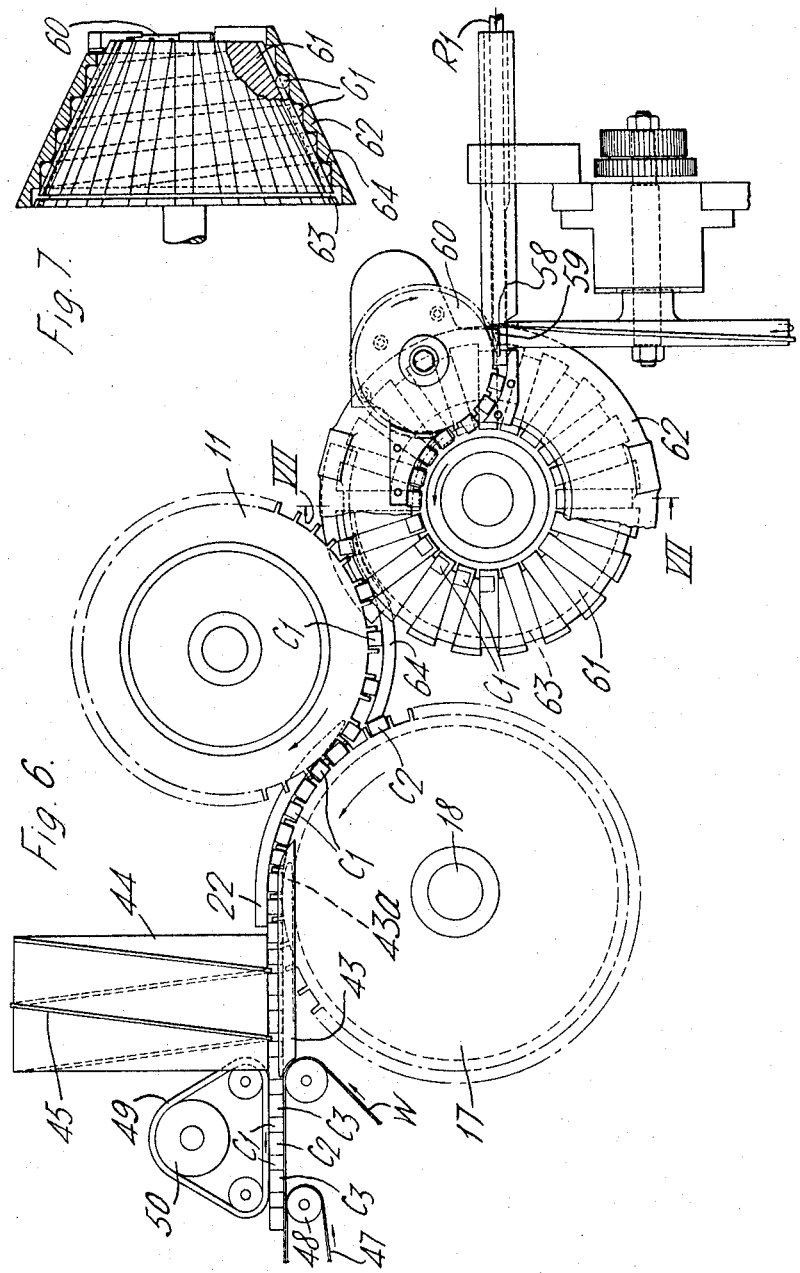

United States Patent Office 3,267,821
Patented August 23, 1966

3,267,821
MANUFACTURE OF MOUTHPIECE FOR CIGARETTES
Tom Rowlands, Deptford, London, England, assignor to The Molins Organisation Limited
Filed Sept. 23, 1963, Ser. No. 310,646
Claims priority, application Great Britain, Oct. 5, 1962, 37,785/62
14 Claims. (Cl. 93—1)

This invention concerns improvements in or relating to the manufacture of a mouthpiece for cigarettes, and in particular to a method and apparatus for making composite mouthpiece rod, and to apparatus for severing components from a rod of mouthpiece material and for feeding components.

By the term "composite mouthpiece rod" is meant mouthpiece rod comprising different components arranged in axial alignment (whether in endwise abutment, or spaced apart endwise) and held together by an outer enclosing wrapper. By the term "component" is meant any portion of mouthpiece material suitable for incorporation in a mouthpiece rod. The term "mouthpiece material" when used herein is to be understood as meaning any material suitable for incorporation in the mouthpiece portion of a mouthpiece cigarette. A composite mouthpiece rod in which components are spaced apart endwise to provide a hollow portion in the rod will be referred to herein as a "hollow composite mouthpiece rod." For convenience a length of mouthpiece rod suitable for incorporation in an individual mouthpiece cigarette will be referred to herein as an "individual mouthpiece," and a portion of mouthpiece rod whose length is a multiple of that of an individual mouthpiece will be referred to herein as a "multiple length mouthpiece," while a portion of mouthpiece rod whose length is double that of an individual mouthpiece will be referred to as a "double length mouthpiece."

In co-pending United States application Ser. No. 303,297, filed August 20, 1963, there is disclosed apparatus for making composite mouthpiece rod in which components, severed from a plurality of different rods of mouthpiece material simultaneously fed lengthwise in parallel relationship, are moved into axial alignment by being fed to a lengthwise moving conveyor band so that the components severed from the different rods are spaced apart sideways across the conveyor band and offset lengthwise therealong, and moved across the band into axial alignment whilst they are fed lengthwise thereby. The stream of axially aligned components is then enclosed in a continuous wrapper to form a continuous composite mouthpiece rod.

According to the present invention there is provided a method of making composite mouthpiece rod, comprising the steps of feeding lengthwise simultaneously a plurality of continuous rods of mouthpiece material, cutting each rod transversely of its length to sever components of a desired length therefrom, spacing apart endwise successive components severed from each rod, feeding the components severed from the rods in timed relationship to a moving conveyor at positions spaced along the conveyor as considered in its direction of movement, the components severed from each rod being fed to the conveyor at each of the said positions respectively, so that the components are carried lengthwise by the conveyor, arranged in line and in a desired sequence along the conveyor, and transferring the aligned components to a continuous wrapper in which they are wrapped to make a continuous composite mouthpiece rod. The continuous composite mouthpiece rod so formed can then be cut to sever desired lengths therefrom, which lengths may be multiple length mouthpieces and may each be a multiple of the length of double-length mouthpieces.

Preferably the method includes the step of abutting endwise the aligned components prior to their being wrapped, but the method may be used to make hollow composite mouthpiece rod, selected pairs of the aligned components being spaced apart endwise to provide hollow portions in the wrapped rod.

As an example, three continuous rods of mouthpiece material may be fed lengthwise simultaneously and have components severed therefrom, the components severed from one rod being fed at a first position to the conveyor to be carried thereby in spaced succession therealong, the components severed from a second rod being fed at a second position to the conveyor into the spaces between the components severed from the said one rod so as to be spaced endwise therefrom, to form on the conveyor a stream of aligned, endwise spaced, lengthwise moving components severed from the said one and said second rods and arranged alternately, and the components severed from the third rod being fed at a third position to the conveyor into the spaces between the components severed from the other two rods so as to form a stream of aligned, lengthwise moving components, in which alternate components have been severed from the said third rod and are positioned between two components, severed one from each of the other rods, which can be wrapped to form a continuous composite mouthpiece rod.

Further according to the present invention there is provided apparatus for making composite mouthpiece rod, comprising means to feed lengthwise simultaneously a plurality of continuous rods of mouthpiece material, cutting means to cut each rod transversely of its length to sever components of a desired length therefrom, means to space apart endwise successive components severed from each rod, means to feed the components severed from the rods in timed relationship to a moving conveyor at positions spaced along the conveyor as considered in its direction of movement, the components severed from each rod being fed to the conveyor at each of the said positions respectively, so that the components are carried lengthwise by the conveyor, arranged in line and in a desired sequence along the conveyor, and means to transfer the aligned components to a continuous wrapper in which they are wrapped to form a continuous composite mouthpiece rod.

Preferably the apparatus includes means to abut the aligned components endwise prior to their being wrapped.

The said conveyor may comprise a rotatable conveyor member, such as a drum, having a periphery adapted (e.g. grooved or toothed) to convey components lengthwise and the said means to feed components to the conveyor may comprise further rotatable feed members, to convey components lengthwise, arranged to rotate in timed relationship with the said conveyor member and positioned adjacent thereto so that components can be transferred from the peripheries of the feed members to the periphery of the conveyor member, there being provided a feed member to feed components severed from each of the said rods of mouthpiece material respectively, and the feed members being arranged at the said positions spaced around the periphery of the said conveyor member.

Each of said further rotatable feed members may comprise, for example, a toothed wheel, or in an alternative form may comprise a fluted truncated cone rotatable about its axis of symmetry, the flutes extending lengthwise of said cone and having a depth less than the thickness of components to be fed, said cone being at least partially enclosed within a component-retaining member having an internal rib of spiral form, said rib being so dimensioned as to be engageable by components accommodated within said flutes so that any such component is constrained to travel in a spiral path defined by said rib upon rotation of said cone.

Said component-retaining member is preferably a casing which substantially covers the curved surface of said cone.

Further still according to the present invention there is provided apparatus for making composite mouthpiece rod, comprising a rotatable conveyor member, such as a drum, having a peripheral surface adapted (e.g. grooved or toothed) to carry components in line lengthwise, means to feed components from a plurality of sources to the conveyor member at positions spaced around its periphery so that, as the conveyor member rotates, it receives components from each of the said sources at each of the said positions respectively, in turn, and a stream of aligned, lengthwise moving components, arranged in a desired sequence is carried on the conveyor member, and means to transfer the said stream of components to a continuous wrapper in which it is wrapped to form a continuous composite mouthpiece rod.

Still further according to the present invention there is provided apparatus as set forth above in which the cutting means for at least one of the rods comprises a rotatable member arranged for rotation about an axis substantially parallel to the rod line, the said member being provided with a screw thread and a cutting blade associated with the thread so as to form the upstream end thereof as considered in the direction of travel of the rod. On rotation of the said member in timed relationship with the feed of the rod, the said blade can sever components of a desired length from the rod, and the components so severed can be fed lengthwise successively by being pushed forwardly by the leading face of the screw thread as the said member rotates.

The screw thread may be of progressively increasing pitch as considered in the direction of feed of the components, so that a progressively increasing endwise spacing of successive components severed from the rod is effected as the components are fed forwardly. There may be provided a ledger to support the rod during cutting thereof by said blade.

Further still according to the present invention there is provided apparatus for feeding components lengthwise in succession, comprising a pair of rotatable members arranged for rotation about an axis substantially parallel to the direction of feed of the components, and positioned adjacent one another, the said members being provided with co-operating screw threads whose leading faces engage successive components and push them forwardly, and being arranged so that the components are supported by and between the said members as they are fed forwardly.

Preferably the said members are arranged to be rotated in opposite directions, and there may be provided a guide element to hold the components between the members as they are fed thereby. There may be provided a cutting blade associated with the thread of one of the said pair of members, so as to form the upstream end of the thread as considered in the direction of movement of the components, whereby the components to be fed can be severed from a lengthwise-fed rod of mouthpiece material. The said screw threads may be of progressively increasing pitch as considered in the direction of feed of the components, so that a progressively increasing endwise spacing of successive components is effected as the components are fed forwardly.

Apparatus in accordance with the invention will now be described by way of example with reference to the accompanying drawing, in which:

FIGURE 1 is a side elevation of apparatus for making composite mouthpiece rod, in which, for clarity, parts of the apparatus have been omitted, FIGURE 2 is a view on the line II—II of FIGURE 1, FIGURE 3 is a sectional view on the line III—III of FIGURE 1, FIGURE 4 shows part of alternative apparatus for use in the apparatus shown in FIGURE 1, FIGURE 5 is a sectional view on the line V—V of FIGURE 4, FIGURE 6 shows a part of the apparatus of FIGURE 1, but including a different form of feed member, and FIGURE 7 is a section on line VII—VII of FIGURE 6.

Referring to FIGURE 1, three continuous rods $R_1$, $R_2$, and $R_3$, of different mouthpiece materials, which are formed by wrapping fillers of mouthpiece material in continuous wrappers, are fed lengthwise horizontally, substantially in the same vertical plane. Thus the rod $R_1$ travels directly above the rod $R_2$, which is directly above the rod $R_3$.

The rod $R_1$ travels through a tubular ledger 1 provided with an inclined downstream face 2 (the left-hand face as viewed in FIGURE 1), and then between two rotatable members 3 and 4 of which only the member 3 is shown in FIGURE 1, but which are both shown in end elevation in FIGURE 2.

Referring to FIGURE 2, the members 3 and 4 are mounted on rotatable shafts 5 and 6 respectively, arranged substantially parallel to the line of the rod $R_1$, and rotate at the same speed in opposite directions. Thus, as viewed in FIGURE 2, the member 3 is rotated clockwise while the member 4 is rotated anti-clockwise. The members 3 and 4 are provided with corresponding screw threads 7 and 8 respectively, of which the screw thread 7 can best be seen in FIGURE 1.

A helical cutting blade 9 is attached to the member 3 so as to form the upstream end of the screw thread 7 (as considered in the direction of travel of the rod $R_1$). As can be seen in FIGURE 2, the cutting edge of the blade 9 is curved so as to progressively project further from the member 3 as considered in the direction opposite to the direction of rotation of the member 3.

The screw threads 7 and 8 are of correspondingly progressively increasing pitch, as considered in the direction of travel of the rod, and the screw thread 7 is a left-hand thread while the screw thread 8 is a right-hand thread. As the members 3 and 4 rotate, the leading faces of the threads 7 and 8 remain in line at the position where the periphery of the member 3 is closest to the periphery of the member 4, and at this position the distance separating the peripheries of the two members is slightly less than the diameter of the rod $R_1$.

The members 3 and 4 rotate in timed relationship with the feed of the $R_1$, so that during each revolution of the member 3 the cutting blade 9 cuts the rod $R_1$ against the inclined face 2 of the ledger 1 to sever a component $C_1$ of a desired length therefrom. The components $C_1$ thus severed are supported by and between the members 3 and 4 (see FIGURE 2) and are successively fed lengthwise by being pushed forwardly by the leading faces of the co-operating screw threads 7 and 8. The progressively increasing pitch of the threads effects a progressively increasing endwise spacing of successive components $C_1$ as they are fed.

Guide elements 10 are positioned to hold the components $C_1$ in correct position between the members 3 and 4, the guide elements being positioned above the path of the components $C_1$ since the peripheries of the members 3 and 4 move upwardly at the position where the components are supported, and there is therefore a tendency for the components to move upwardly under the action of friction.

A wheel 11, mounted on a rotatable shaft 12, is positioned above the members 3 and 4 so as to pass therebetween and between the guide elements 10, which are shaped to accommodate the wheel 11 (see FIGURE 2). As can be seen in FIGURE 2, the wheel 11 comprises two outer discs 13 attached to a central disc 14, whose periphery projects beyond the peripheries of the discs 13. The central disc 14 is provided with radially extending peripheral teeth 15 (FIGURE 1), arranged in pairs which are equi-spaced around the periphery of the disc, the distance separating two teeth in a pair being approximately equal to the length of a component $C_1$.

The wheel 11 is rotated (clockwise as viewed in FIGURE 1) in timed relationship with the rotation of the members 3 and 4, so that the components $C_1$ fed forwardly in endwise spaced relationship by the latter are received successively between pairs of teeth 15, and conveyed lengthwise by the wheel 11 over a guide member 16. The components $C_1$ are then fed in succession by the wheel 11 to a conveyor in the form of a drum 17 mounted on a rotatable shaft 18.

Referring to FIGURE 3, in which part of the drum 17 is shown in section, the drum comprises a central disc 19 attached to two outer discs 20 whose peripheries extend beyond that of the disc 19, and are provided with radially extending teeth 21. The teeth 21 are arranged in pairs equi-spaced around the peripheries of the discs 20, the distance between two teeth 21 in a pair being approximately equal to the length of a component $C_1$, and the teeth on each of the discs 20 being opposite one another.

The drum 17 is rotated so that its peripheral speed equals that of the wheel 11, and so that the pairs of teeth 15 register with the pairs of teeth 21 at the position where the peripheries of the drum and wheel interfere, the teeth 15 passing between the teeth 21 on the two discs 20 as shown in FIGURE 3. Guide elements 22 are arranged on either side of the disc 14 at this position, to guide the components $C_1$ from the wheel 11 on to the drum 17, on which they are conveyed lengthwise, successive components $C_1$ being received between successive pairs of teeth 21 on the discs 20.

The rods $R_2$ and $R_3$ pass to apparatus similar to that described above to which the rod $R_1$ passes.

Thus the rod $R_2$ travels through a ledger 23 and between a pair of co-operating rotating members, only one, 24, of which is shown in FIGURE 1. These members are provided with corresponding screw threads of progressively increasing pitch, the increase in pitch of the thread 25 on the member 24 being clearly shown in FIGURE 1. The member 24 has a helical cutting blade 26 attached thereto so as to form the upstream end of the thread 25, and the two members co-operate in timed relationship with the feed of the rod $R_2$ to sever components $C_2$ of a desired length therefrom, and feed the components lengthwise, effecting an endwise spacing of successive components as they are fed forwardly, in a manner described above in respect of the rod $R_1$ and components $C_1$.

Guide elements 27, similar to the guide elements 10, act to guide the components $C_2$ as they are fed, and a wheel 28, mounted on a rotatable shaft 29, passes between the guide elements 27. The wheel 28 is similar in construction to the wheel 11, and has a projecting central disc provided with peripheral teeth 30 arranged in pairs equi-spaced around the periphery of the disc, the distance separating two teeth 30 in a pair being approximately equal to the length of a component $C_2$ (which, in the present case, is double the length of a component $C_1$).

The wheel 28 is rotated (clockwise as viewed in FIGURE 1) in timed relationship with the feed of the components $C_2$, so that successive components $C_2$ are received between successive pairs of teeth 30, and are conveyed lengthwise by the wheel 28 over a guide member 31, to be transferred to the conveyor drum 17, guide elements 32 being provided to assist in the transfer.

The rod $R_3$ passes between the rotatable members which feed the components $C_2$, near the lower portions of their peripheries, through a ledger 33 and between a pair of co-operating rotating members provided with corresponding screw threads, one, 34, of the members being shown in FIGURE 1 with its screw thread 35, and being provided with an associated helical cutting blade 36. The members cooperate, as previously described, in timed relationship with the feed of the rod $R_3$ to sever components $C_3$ of a desired length (which, in the present case is equal to the length of the components $C_2$) from the rod, and to space the components endwise whilst feeding them lengthwise under guide elements 37.

A wheel 38, mounted on a rotatable shaft 39, passes between the rotating members and the guide elements 37 in a manner already described. The wheel 38 is similar in construction to the wheel 11, but in this case the central disc is provided with single teeth 40, equi-spaced around its periphery and separated by a distance approximately equal to the length of the components $C_3$. The wheel 38 is rotated (clockwise as viewed in FIGURE 1) in timed relationship with the feed of the components $C_3$, so that successive components $C_3$ are received between successive teeth 40, and are conveyed lengthwise by the wheel 38 over a guide member 41, to be transferred to the conveyor drum 17, guide elements 42, which are extensions of the guide member 31, being provided to assist in the transfer.

In this manner components $C_1$, $C_2$, and $C_3$ are fed from three separate sources (i.e. severed from the rods $R_1$, $R_2$ and $R_3$ respectively) to the conveyor drum 17. As can be seen in FIGURE 1, the wheels 11, 28 and 38 are spaced around the periphery of the conveyor drum 17 so that, as the drum rotates, it receives components from each of the wheels 38, 28 and 11 respectively in turn.

The pairs of teeth 21 on the drum 17 are spaced apart by a distance approximately equal to the length of the components $C_3$ (which equals the length of the components $C_2$), and the two teeth 21 in each pair are separated by a distance approximately equal to the length of the components $C_1$.

The components $C_3$ are fed to the drum 17 by the wheel 38 so that successive components $C_3$ are received in alternate spaces between the pairs of teeth 21. Thus, as can be seen in FIGURE 1, that portion of the periphery of the drum 17 travelling over the guide element 42 between the wheels 38 and 28 carries successive components $C_3$ each positioned between successive pairs of teeth 21, the spaces on either side of the said pairs of teeth remaining empty. The wheel 28 then feeds components $C_2$ to the drum 17 into the said empty spaces, so that the portion of the periphery of the drum 17 travelling between the wheel 28 and the wheel 11 carries components $C_2$ and $C_3$ in alternate arrangement positioned between the pairs of teeth 21, and conveys the components lengthwise over the guide elements 32 and member 16. The wheel 11 then feeds successive components $C_1$ to the drum 17 into the spaces between the teeth 21 in each successive pair. In the stream of aligned, lengthwise moving components thus formed, alternate components are components $C_1$, each positioned between a component $C_2$ and a component $C_3$.

The stream of components is then transferred from the conveyor drum 17 to a grooved bridge member 43 having side guides extending on either side of the drum 17 and a central portion extending between the outer discs 20 and beneath the components, so that the components are lifted from the drum 17 by the said central portion and travel therealong through the groove between the side guides.

Above the bridge member 43 is mounted a worm wheel 44, provided with a worm thread 45, which rotates about an axis parallel to the direction of feed of the components, and acts to push successive pairs of components along the bridge member 43 and on to a wrapper web W. The web W passes about a roller 46, and is moved, by a driven conveyor tape 47 passing about a roller 48, at a speed slightly less than the rate of feed of components by the worm wheel 44. Above the web W is an endless band 49, which is driven by a driving roller 50 to move at the same speed as the web. The worm wheel pushes the components into endwise abutment between the web W and band 49 in a manner more fully described in co-pending United States Patent application Ser. No. 260,564, filed Feb. 25, 1963, now Patent No. 3,131,612.

If desired, the worm wheel 44 could be omitted from the apparatus, the components being abutted as they are received on the bridge member 43 by being pushed into endwise abutment by the teeth 21 on the drum 17, the peripheral speed of the latter being greater than the speed at which the components are moved by the band 49 and web W.

The stream of endwise-abutted components is then conveyed on the wrapper web W by the tape 47 through a garniture (not shown) in which the components are enclosed in the wrapper to form a continuous composite mouthpiece rod, which then passes to cut-off mechanism, which severs multiple length mouthpieces of a length which is a multiple of that of a double length mouthpiece from the rod. The manner in which the continuous composite mouthpiece rod is severed, and the manner in which the multiple length mouthpieces so formed are sub-divided to ultimately produce individual mouthpieces, are described in co-pending United States patent application Ser. No. 260,564, filed Feb. 25, 1963.

FIGURES 4 and 5 illustrate an alernative form of construction for the conveyor drum 17 and the feed wheels 11, 28 and 38, and show parts of a feed wheel 51 and a conveyor drum 52 whose relative positions are the same as those of the feed wheel 38 and the conveyor drum 17.

The wheel 51 and drum 52 are provided with peripheral grooves 53 and 54 respectively, the grooves being defined by side walls 55 and 56 respectively. Components C are carried lengthwise in the groove 53 on the rotating wheel 51, gripped between side walls 55, and are transferred to the drum 52 by means of a guide element 57, which acts to lift the components from the groove 53 and guide them into the groove 54, in which they are gripped by the side walls 56 and conveyed lengthwise by the rotating drum 52.

FIGURES 6 and 7 illustrate a modified arrangement of part of the apparatus described above, having a different form of feed member. It will be seen that various parts shown in FIGURE 6 correspond exactly to those bearing siimlar references in FIGURE 1 and such parts will not be further described. However, in FIGURE 6 it will be seen that the rod $R_1$ is fed to a rotary knife comprising a rotatable disc with a helical blade formed on its periphery, and 58, a cooperating ledger 59, and that components $C_1$ cut from the rod $R_1$ by knife 58 are carried by a toothed feed wheel 60 to the top of a rotatable feed member 61 in the form of afluted truncated cone. The member 61 is largely enclosed by a casing 62 which substantially covers the curved surface of the cone. Said casing 62 however is open top and bottom, the top opening being somewhat deeper to one side (see FIGURE 7) to allow the periphery of wheel 60 to have access to the cone so that components $C_1$ may drop from wheel 60 into the flutes of member 61. The bottom opening is similarly deeper adjacent wheel 11 to allow components $C_1$ to pass from the flutes of member 61 to said wheel 11, and to promote the transfer the member 61 has a circumferential groove 63 near its bottom, into which a curved deflector finger 64 extends in the neighbourhood of wheel 11, said finger pointing against the direction of rotation (anticlockwise as shown in FIGURE 6) of the member 61.

The flutes in the member 61 are of constant width, equal to the length of components $C_1$ plus a small working clearance, and their depth is of the order of half the diameter of components $C_1$. The components once fed into the flutes of member 61 therefore project therefrom and the casing 62 has an internal rib 64 so dimensioned that components $C_1$ in said flutes are prevented from rolling or sliding down the flutes by engagement with said rib. However, as the member 61 is rotated, the spiral form of rib 64 permits a gradual descent of the components so that regular spacing of the latter is preserved, such spacing being increased as the components descend. Moreover, if any components are slightly over-size and tend to stick in the flutes, they will engage the underside of rib 64 as the member 61 rotates and be constrained to descend.

With the arrangement of FIGURES 6 and 7, it will be appreciated that components move down, i.e. perpendicular to the plane of the drawing, while they are in the flutes of member 61. Thus if the arrangement of FIGURES 6 and 7 is employed in feeding components $C_1$ while the arrangement of FIGURE 1 is retained for components $C_2$, $C_3$ the rod $R_1$ is fed in a different plane from that occupied by rods $R_2$, $R_3$ which may permit some economy of space is desired. Moreover, as previously noted, as the components travel down the flutes of member 61 their spacing is increased although regularity is preserved, and it will be understood that it is this feature which permits the relatively cheap and single knife 58 to be used in place of the member 3 of FIGURE 1 which functions both as a knife and as means for producing the required spacing between successive components.

It will be appreciated that, if desired, a method and apparatus in accordance with the present invention could be used to make hollow composite mouthpiece rod, successive components being spaced apart endwise when they are wrapped to provide hollow portions in the rod. For example, the worm wheel 44 could be used to effect a desired endwise spacing of components in a manner as described in co-pending United States patent application Ser. No. 260,564, filed Feb. 25, 1963.

What I claim as my invention and desire to secure by Letters Patent is:

1. A method of making composite mouthpiece rod, comprising the steps of feeding lengthwise simultaneously a plurality of continuous rods of mouthpiece material, cutting each rod transversely of its length to sever components of a desired length therefrom, spacing apart endwise successive component severed from each rod, feeding the components severed from the rods in timed relationship to a moving conveyor at positions spaced along the conveyor as considered in its direction of movement, the components severed from each rod being fed to the conveyor at each of the said positions respectively, so that the components are carried lengthwise by the conveyor, arranged in line and in a desired sequence along the conveyor, transferring the aligned components to a continuous wrapper, and forming said wrapper into a tube enclosing said components to make a continuous composite mouthpiece rod.

2. A method as claimed in claim 1, including the further step of cutting the continuous composite mouthpiece rod to sever desired lengths therefrom.

3. A method as claimed in claim 1, including the step of abutting the aligned components endwise before they are wrapped.

4. A method as claimed in claim 1, including the step of spacing apart endwise selected pairs of the aligned components before they are wrapped.

5. A method of making composite mouthpiece rod, comprising the steps of feeding lengthwise simultaneously three rods of mouthpiece material, cuting each rod transversely of its length to sever components of a desired length therefrom, spacing apart endwise successive components severed from each rod, feeding components severed from one of said rods at a first position to a moving conveyor to be carried thereby in spaced succession therealong, feeding components severed from a second one of said rods at a second position to said conveyor into the spaces between the components severed from the one rod so as to be spaced endwise therefrom and form on the conveyor a stream of aligned, endwise spaced, lengthwise moving components severed from the one and the second rods and arranged alternately, feeding components severed from the third one of said rods at a third position to said conveyor into the spaces between the components severed from the other two rods, transferring the aligned components to a continuous wrapper, and forming said wrapper into a tube enclosig said components.

6. Apparatus for making composite mouthpiece rod, comprising, in combination, means to feed simultaneously a plurality of continuous rods of mouthpiece material, cutting means to cut each rod transversely of its length to sever components of a desired length therefrom, means to space apart endwise successive components severed from each rod, a moving conveyor, means to feed the components severed from the rods in timed relationship to said moving conveyor at positions spaced along the conveyor as considered in its direction of movement, the components severed from each rod being fed to the conveyor at each of the said positions respectively, so that the components are carried lengthwise by the conveyor, arranged in line and in a desired sequence, means to transfer the aligned components to a continuous wrapper, and means to form said wrapper into a tube enclosing said components to make a continuous composite mouthpiece rod.

7. Apparatus as claimed in claim 6, including means to abut the aligned components endwise prior to their being wrapped.

8. Apparatus as claimed in claim 6, in which the conveyor comprises a rotatable member having a periphery adapted to convey components lengthwise.

9. Apparatus as claimed in claim 8, in which said conveyor comprises a toothed drum.

10. Apparatus as claimed in claim 6, in which the means to feed components to the conveyor comprises rotatable members whose peripheries are adapted to convey components lengthwise, said rotatable members being arranged to rotate in timed relationship with the conveyor.

11. Apparatus as claimed in claim 10, in which at least one of said rotatable members is a toothed wheel.

12. Apparatus as claimed in claim 8, in which said at least one of said rotatable members comprises a fluted truncated cone rotatable about its axis of symmetry, the flutes extending lengthwise of said cone and having a depth less than the thickness of components to be fed, and including a component-retaining member at least partially enclosing said cone, said component-retaining member having an internal rib of spiral form and so dimensioned as to be engageable by components accommodated within said flutes so that any such component is constrained to travel in a spiral path defined by said rib upon rotation of said cone.

13. Apparatus as claimed in claim 6, in which the cutting means for at least one of the rods comprises a rotatable member arranged for rotation about an axis substantially parallel to the rod line, the said member being provided with a screw thread and a cutting blade associated with the thread so as to form the upstream end thereof as considered in the direction of travel of the rod.

14. Apparatus as claimed in claim 13, in which the screw thread has a progressively increasing pitch as considered in the direction of feed of the components.

References Cited by the Examiner
UNITED STATES PATENTS 2,882,970  4/1949  Schur ------------------ 93—1
2,953,878  9/1960  Schur.

BERNARD STICKNEY, *Primary Examiner.*